Figures 1, 2:
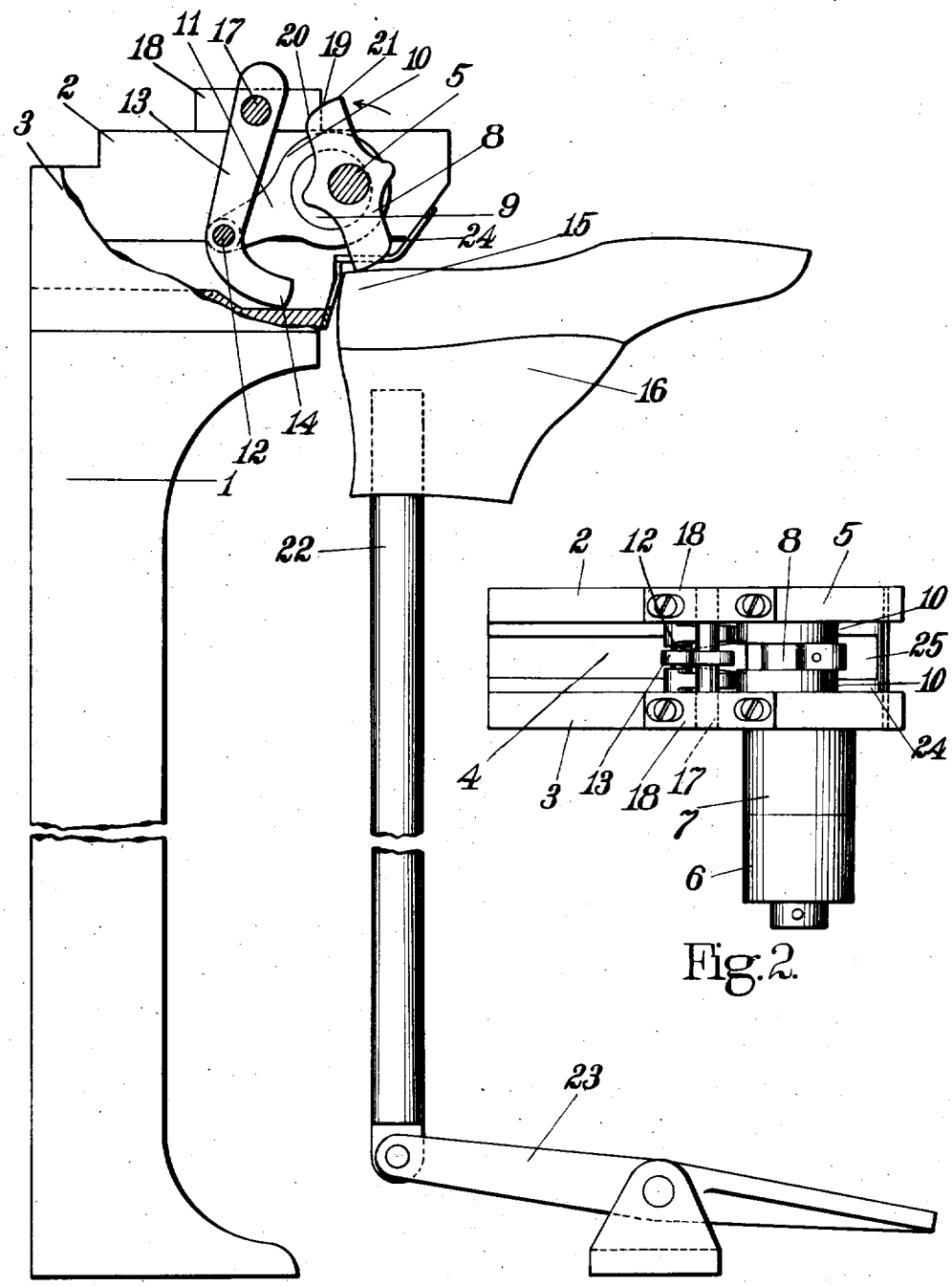

I. E. FLETCHER.

ROTARY HEEL SEAT MAKER AND COUNTER POUNDER.

APPLICATION FILED FEB. 26, 1909.

Reissued Mar. 19, 1912. 13,385.

WITNESSES:
Edith C. Holbrook
Elizabeth C. Cole

INVENTOR.
Ira E. Fletcher
By his Attorney
Nelson H. Konrad

COLUMBIA PLANOGRAPH CO., WASHINGTON, D. C.

UNITED STATES PATENT OFFICE.

IRA E. FLETCHER, OF MONTELLO, MASSACHUSETTS, ASSIGNOR TO UNITED SHOE MACHINERY COMPANY, OF PATERSON, NEW JERSEY, A CORPORATION OF NEW JERSEY.

ROTARY HEEL-SEAT MAKER AND COUNTER-POUNDER.

13,385. Specification of Reissued Letters Patent. Reissued Mar. 19, 1912.

Original No. 872,617, dated December 3, 1907, Serial No. 336,279. Application for reissue filed February 26, 1909. Serial No. 480,289.

*To all whom it may concern:*

Be it known that I, IRA E. FLETCHER, a citizen of the United States, residing at Montello, in the county of Plymouth and State of Massachusetts, have invented a new and useful Improvement in Rotary Heel-Seat Makers and Counter-Pounders, of which the following is a specification.

The endeavor at present in shoe factories is to secure speed, uniformity and perfection of work, and accordingly I have invented the hereinafter described heel-seat maker and counter shaper or pounder for accomplishing the objects mentioned with relation to the heel part of the shoe.

In carrying out my invention I provide a rotary hammer for pounding and shaping the heel-seat and in connection with said rotary hammer I provide a pounder or shaper for the adjacent vertical portion of the counter, said counter hammer moving preferably at a slower speed than the rotary heel-seat hammer. The latter hammer is so constructed that its initial blow is light, followed by a smoothing movement and then a hard striking or pressing blow. The result is that the comparatively stiff bends of leather which form the heel-seat are neatly bent over and smoothed down, the light blow serving to bend them down and push the folds forward gently, while the harder pressure draws the leather of the counter, and sets the tacks solid at the same time. This operation proceeds with great rapidity so that the heel-seat is made quickly and with entire uniformity throughout all parts thereof. The rotary hammer not only gives great rapidity of blows but keeps the machine in balance so that it can be run at a high speed with great uniformity of operation.

In the drawings: Figure 1 represents in side elevation and partly in section a preferred embodiment of my invention; Fig. 2 is a top plan view thereof.

On a suitable pedestal 1 is mounted a frame or head-piece comprising opposite supporting walls 2, 3 having a cavity or channel 4 between them and supporting a shaft 5 provided with fast and loose pulleys 6, 7. Centrally secured to said shaft is a transverse hammer-head 8 and at the opposite sides thereof are eccentric straps 10 whose rear arms 11 are pivotally connected at 12 with a depending hammer or pounder 13 whose head 14 curves forwardly in position to operate against the vertical counter portion 15 of a shoe 16, the upper end of said pounder 13 being pivotally mounted at 17 in adjustable blocks 18. The hammer-head 8, which as shown has a plurality of striking ends extending radially in different directions from the axis of rotation, rotates in the direction of the arrow Fig. 1 and its striking faces are eccentrically curved as clearly indicated at 19 so that the forward engaging portion 20 is at a shorter radial distance from the center 5 than the rear or following end 21.

Preferably, and as shown, the relative construction and arrangement of the beaters 8 and 13 is such that the rotary beater 8 engages the bottom of the shoe with a wiping action directed from the shoe edge inwardly while the reciprocating beater 13 delivers blows against the side of the shoe at its edge. The timing of the action of the eccentric straps 10 which operate the pounder 13 is such with relation to the revolution of shaft 5 to which is secured the pounder 8 that the two pounders strike the shoe substantially simultaneously, the blows of the side beater 13 substantially registering with the action of one of the striking faces of the pounder 8, while the action of the other striking face of the pounder 8 alternates with the blows of the side beater 13, with the result that the blows from the reciprocating beater 13 alternate with the wiping contacts of the striking faces of the rotary pounder 8.

The shoe and its contained last are mounted on any suitable kind of work rest such for instance as a post 22 operated by a foot-treadle 23.

It will be understood that I have shown my invention in its simplest form and have omitted many of the minor constructional details in order clearly to show the essential features. Preferably a work positioning plate or rest 24 is secured to the front lower end of the head and is apertured at 25 to permit the hammers to operate on the shoe and the rest has an angular bend as shown in Fig. 1 to form a seat or rest-cavity for receiving the shoe and aiding the operator in properly positioning the same.

In use the operator places a shoe on the post 22 and raises the same with the foot lever into position as shown in Fig. 1 whereupon the rapidly rotating hammer 8 delivers a series of quick blows on the projecting edges of the upper materials and the counter about the heel-seat and at the same time a slower series of lateral blows is delivered against the side of the shoe, the result being that the upper materials and the counter of the shoe are rapidly worked into correct position and given the superior formation and shaping which are desired. The rotary hammer not only does its work with great speed but its movement is very uniform inasmuch as the opposite portions of the hammer, or two-hammers-in-one balance each other and also aid by their centrifugal force in giving a precision and uniformity of movement. The shorter end 20 of the oblique ended hammer serves to crush down and form the leather while the middle portion and end 21 press the leather hard down and set the tacks in solidly as required in the best grades of work. By shifting the hammer 13 slightly, its angle and character of blow may be changed although the character of the blow is regulated mostly by the position in which the operator holds the shoe and the pressure applied through the foot-lever, this being especially the case as to the vertical pressure, or blows from the hammer 8.

While I have herein shown and described my invention in its preferred embodiment I wish it to be understood that I am not limited to the precise details shown.

Having described my invention, what I desire to secure by Letters Patent is:

1. A heel-seat maker, comprising a heel rest, a rotary hammer above said heel rest for delivering a series of swinging blows to form the heel-seat, combined with a swinging side pounder in the same vertical plane with said hammer below and back of the hammer for simultaneously pounding the counter immediately next to the portion of the heel-seat being crushed down by the hammer, said hammer and pounder being constructed and arranged to strike the leather in directions tending to work the leather forward in the same direction over the edge of the last and inwardly on the heel-seat.

2. A heel-seat maker, comprising a rotary hammer having a plurality of striking ends extending radially in different directions from the axis of rotation, a work rest for maintaining the shoe in position to receive a series of rapid blows from said hammer at the heel-seat region, combined with a side pounder for engaging the counter adjacent the heel-seat, and means for operating said side pounder to deliver a slower series of blows than said rotary hammer.

3. A heel-seat maker, comprising a rotary hammer for delivering a series of swinging blows to form the heel-seat, a swinging hammer adjacent said rotary hammer for simultaneously pounding the counter adjacent said heel-seat, and a connection from said rotary hammer to said swinging hammer for operating the latter by the former.

4. A heel-seat maker, having an angular heel rest to position the heel of a shoe, a transverse rotary shaft mounted approximately vertically above said heel rest, a radially extending hammer mounted to revolve with said rotary shaft, said radial hammer having the front edge of its outer end beveled and at such a distance from the shaft that when a shoe is in place in said heel rest the beveled end of the hammer first strikes a light blow which is followed by a forward horizontal, sliding, crushing pressure of the back portion of said outer end of the hammer on the heel-seat of the shoe, an eccentric on said shaft, a laterally movable hammer having its striking end opposite the lower portion of said heel rest to strike against the counter of the shoe, and an eccentric strap from said eccentric to said hammer, arranged to move the latter at each revolution of said shaft to strike a blow against the counter of the shoe.

5. A heel-seat maker, comprising a heel rest, a shaft mounted transversely above said rest, a radial hammer fast on said shaft and arranged to swing across said heel rest for giving a long sliding blow and rubbing pressure across the heel-seat of the shoe, a swinging hammer pivotally mounted above said shaft, having its lower end curved forwardly toward said heel rest, and operating means extending from said shaft to said swinging hammer for simultaneously swinging the latter hammer as the first mentioned hammer rotates.

6. In a rotary shoe pounding machine the combination with a rotary shoe bottom beater and means for actuating it to deliver inwardly directed blows on the shoe bottom adjacent to its edge in rapid succession, of means arranged to beat the side of the shoe adjacent to the point of operation of the bottom beater while the upper is being acted upon by the bottom beater.

7. In a rotary shoe pounding machine the combination with a rotary shoe bottom beater having an annular series of striking members spaced apart to strike distinct blows directed inwardly from the edge of the shoe bottom, of means arranged to beat the side of the shoe adjacent to its edge while the shoe is in position to receive the action of the rotary beater upon its bottom.

8. In a rotary shoe pounding machine the combination with a rotary shoe bottom beater having a plurality of striking members spaced apart to deliver separate blows directed inwardly from the edge of the shoe, of a reciprocatory side beater arranged relatively to the rotary beater to block the side of the shoe while the bottom is being pounded, and connected mechanism for actuating the two beaters.

9. In a rotary shoe pounding machine the combination with a rotary beater for treating the bottom of a shoe, and means for actuating said beater about an axis substantially parallel with the shoe bottom, of a reciprocatory side beater, and means for unyieldingly actuating the side beater forward to a predetermined relation with the bottom beater.

10. In a rotary shoe pounding machine the combination with a rotary beater for treating the bottom of a shoe, of a reciprocatory side beater, and means for unyieldingly actuating the side beater forward to a predetermined relation with the bottom beater, and a shoe side rest apertured to permit the engagement of the shoe with the side beater.

11. In a machine of the class described, the combination with a shoe bottom pounder, of a shoe side pounder arranged in the same vertical plane, and means for imparting continuous rotary motion to one pounder about an axis substantially parallel with the surface of the shoe on which it acts, and reciprocatory motion to the other pounder from and toward the surface on which it acts.

12. In a shoe pounding machine the combination with a rotary pounder, of a reciprocatory pounder movable in the same vertical plane and in a path substantially tangential to the path of the rotary pounder, and means for actuating the two pounders to beat the side and bottom of a shoe adjacent to its edge.

13. In a shoe pounding machine the combination with a rotary pounder, of a reciprocatory pounder movable in the same plane and in a path substantially tangential to the path of the rotary pounder, and means for actuating the two pounders to beat the side and bottom of a shoe adjacent to its edge, said machine having provision for relatively adjusting the two pounders.

14. In a shoe pounding machine the combination with a shoe bottom pounder, of a shoe side pounder and means for imparting continuous rotary motion to one pounder and reciprocatory motion to the other pounder, said machine having provision for adjustment to vary the relative angular directions of the blows of the two pounders.

15. In a shoe pounding machine the combination with a shoe bottom pounder, of a shoe side pounder, and means for actuating said two pounders to beat the side and bottom of a shoe adjacent to its edge, said machine having provision for adjustment to change the relative angular directions of the blows delivered by the two pounders.

16. In a shoe pounding machine the combination with a shoe bottom pounder, of a shoe side pounder, means to assist the operator in positioning the shoe to receive the action of the side and bottom pounders, and means for imparting continuous rotary motion to one pounder in a plane perpendicular to the surface being treated by it and reciprocating motion to the other pounder.

17. In a shoe pounding machine the combination with a rotary pounder arranged to draw the upper inwardly from the shoe edge, of a reciprocatory side pounder to beat the side of the shoe, and operating mechanism arranged to cause the reciprocatory pounder to strike the shoe with every alternate blow of the rotary pounder.

18. In a shoe pounding machine a rotary hammer having a plurality of separate striking heads spaced a substantial distance apart and each having a striking face eccentrically curved as at 19 so that the forward engaging portion 20 thereof is at a shorter radial distance from the axis of the hammer than the rear portion of the face combined with treadle controlled means arranged for firmly holding a lasted shoe in position for its bottom face to be engaged by said hammer striking faces.

19. In a shoe pounding machine a rotary hammer having a plurality of unyielding striking ends spaced a substantial distance apart and each having a striking face formed to deliver a light initial blow followed by a smoothing movement and then by a hard crushing blow, combined with a work rest to sustain the shoe under the hammer, arranged to cause said crushing blows to be directed downwardly and inwardly against the shoe bottom, substantially as and for the purpose described.

20. In a shoe pounding machine the combination with a rotary hammer comprising a radially projecting arm having a striking face formed and arranged to deliver a light initial blow to bend down and smooth the upper on a shoe bottom followed by a hard crushing blow to set the upper, of a rest arranged with relation to said striking face for engaging a lasted shoe and supporting it with its bottom tangential to the path of said striking face.

21. In a shoe pounding machine the combination with a rotary pounder, of a reciprocatory pounder movable in the same plane, means for actuating the two pounders to beat the side and bottom of a shoe adjacent to its edge, and a rest having a formation to engage the bottom and the side of the shoe adjacent to the paths of the pounders and position the shoe with relation to both the pounders.

22. In a shoe pounding machine the combination with a rotary pounder for beating the upper on the shoe bottom inwardly, of a shoe positioning means of angular formation having a portion arranged to overlie the shoe bottom adjacent to the pounder and a portion arranged to engage the side of the shoe, a work rest, and means to actuate said work rest for clamping the shoe upwardly against the overlying portion of the positioning means to maintain the shoe against forward displacement by the pounder.

23. In a shoe pounding machine the combination with a rotary shoe bottom pounder, of a reciprocating shoe side pounder, a work rest, and means for relatively moving the pounders and the work rest to cause the shoe on the rest to receive the action of the two pounders.

24. A shoe pounding machine having, in combination, a shaft, a rotary bottom beater upon the shaft, an eccentric on said shaft adjacent to said beater, an oscillatory side beater located behind the bottom beater and an eccentric strap connecting the side beater and the eccentric.

25. A shoe pounding machine having, in combination, a frame, a guide having an opening through which a portion of a shoe is presented for treatment of the shoe bottom, said guide presenting an angle for the reception of the edge of the shoe, a bottom beater operating through the opening at one side of the angle, a side beater operating through the opening at the other side of the angle, and means for actuating the two beaters.

26. A shoe pounding machine having, in combination, a rotary shoe beater and a second beater arranged relatively thereto to treat the side of the shoe while the shoe bottom is being treated by the rotary beater, and a rest for the bottom and side of the shoe arranged relatively to the two beaters to position the work for the action of both beaters simultaneously.

27. A shoe pounding machine having, in combination, a rotary beater having a striking face arranged to engage the bottom of the shoe with a wiping action directed from the shoe edge inwardly, and a reciprocating beater arranged to deliver blows against the side of the shoe at its edge together with actuating mechanism arranged to cause said beaters to strike the shoe substantially simultaneously.

28. A shoe pounding machine having, in combination, a rotary beater having two striking faces arranged to engage the bottom of the shoe with a wiping action directed from the shoe edge inwardly, and a reciprocating beater arranged to deliver blows against the side of the shoe at its edge together with actuating mechanism arranged to cause the blows of the side beater to register substantially with the action of one of said striking faces to shape the edge of the shoe and to cause the action of the other striking face to alternate with the blows of the side beater.

29. A shoe pounding machine having, in combination, a rotary beater having a striking face arranged to engage the bottom of the shoe with a wiping action directed from the shoe edge inwardly, and a reciprocating beater arranged to deliver blows against the side of the shoe at its edge together with actuating mechanism for the two beaters arranged to cause a blow from the reciprocating beater against the side of the shoe to alternate with a wipe of said striking face.

In testimony whereof I have signed my name to the specification in the presence of two subscribing witnesses.

IRA E. FLETCHER.

Witnesses:
GEO. N. GORDON,
MILDRED L. LIVINGSTON.

Copies of this patent may be obtained for five cents each, by addressing the "Commissioner of Patents, Washington, D. C."